UNITED STATES PATENT OFFICE.

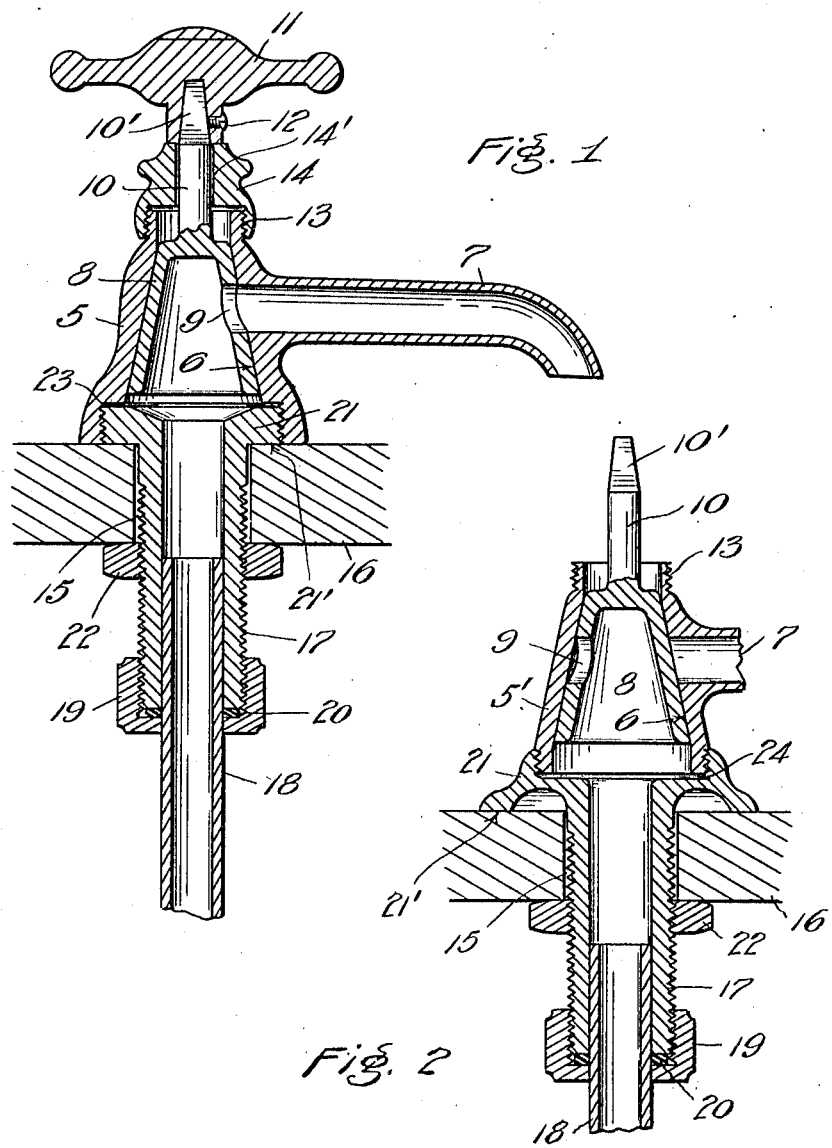

GEORGE A. BAUGHAN, OF SEATTLE, WASHINGTON.

VALVE.

1,026,195.  Specification of Letters Patent.  Patented May 14, 1912.

Application filed September 8, 1910. Serial No. 581,114.

*To all whom it may concern:*

Be it known that I, GEORGE A. BAUGHAN, a citizen of the United States, residing at Seattle, in the county of King and State of Washington, have invented certain new and useful Improvements in Valves, of which the following is a specification.

This invention relates to valves and, more particularly, to that class known as basin-cocks; and its object is the production of an improved valve of this character which will be of inexpensive construction, neat in appearance, not easily deranged and efficient in operation.

To these ends, the invention consists in the novel construction and combination of parts, as will be hereinafter fully described, illustrated and claimed.

In the drawings, Figure 1 is a vertical longitudinal section of a basin-cock embodying my invention. Fig. 2 is a similar view of a modification with certain parts omitted.

The reference numeral 5 designates the valve-body provided with a conical bore 6 from which a side outlet opens into a spout 7. The valve proper 8 is of the hollow plug type having the form of frustum of a cone, and is adapted to seat against the bore of the body. Said valve is open at the bottom and has an opening 9 in its peripheral wall to furnish communication between the interior of the valve and the outlet through said spout. Axially of the valve is an upwardly extending stem 10 having its extremity 10' of a pyramidal shape, desirably, to fit within a corresponding socket provided in a handle 11, whereby the valve is rotated to open or close the same. The handle is detachably secured to the stem by suitable means such as a set screw 12. At the top of the body 5 it is provided with an external screw thread 13 to engage an internal thread of a cap 14. This cap is provided with an aperture 14' through which the valve stem extends. The cap serves as a lifting nut which is utilized through the medium of the handle 11, for adjusting the valve with respect to its seat.

Extending through a hole 15 of a basin-slab 16 is an externally threaded sleeve 17 into the lower end of which is inserted the water supply tube 18. A gland nut 19 is employed upon the sleeve to accommodate packing 20 which precludes the leakage of water at the joint. Provided at the upper end of the sleeve and integral therewith is a head 21 of greater diameter than the sleeve and affording a shoulder 21' which coacts with a lock-nut 22 screwed upon the sleeve from below the slab for rigidly securing the sleeve to the slab. A gasket of rubber, or an equivalent, may be interposed between the head and the slab, and also between the latter and the lock-nut, if desired. As illustrated in Fig. 1, the peripheral surface of the head is screw-threaded to engage with an internal thread in a recess 23 provided at the bottom of the valve body 5. In the modification, however, the head 21 (Fig. 2) is formed with a screw-threaded socket 24 for the reception of the valve-body 5' which is accordingly provided with an external thread.

In operation, the wear of the valve may be taken up by manipulating the cap to raise the valve into close contact with its seat and then turning the handle to effect the grinding of the valve or its seat. This operation may be expedited by unscrewing the body 5 from the head 21 of the coupling sleeve and retracting the cap 14 from the handle so that a gritty substance, like ground glass, may be introduced between the valve and its seat. Ordinarily the turning of the valve in the opening and closing operation of same will suffice to maintain the valve seating in good condition.

What I claim, is—

A basin faucet comprising a substantially frusto-conical casing providing a valve chamber, said chamber of frusto-conical shape in contour, said casing at its lower end provided with an offset interiorly threaded annular flange depending from and constituting a support for the casing, said flange further provided with a pocket, said casing further provided at its top with a peripherally threaded annular collar, a spout communicating with said chamber, a frusto-conical shaped hollow plug mounted in said chamber and engaging the walls thereof and provided with a side opening adapted to communicate with said spout, said plug having a closed top and being of less length than the chamber, a stem integral with the top of the plug and projecting above said peripherally threaded collar, a cap engaging said threaded collar and through which said stem projects, a handle connected to the projecting end of the stem, said cap constituting a lifting nut for adjustment of the plug, a sleeve having its upper end formed with a laterally-projecting annular peripherally threaded head extending in said pocket and engaging with the threads of said offset flange of the casing whereby the latter is coupled with the sleeve, and means in connection with said head for fixedly securing the sleeve and casing to a support, the lower faces of the annular flange and the threaded head being flush and both engaging said support.

GEORGE A. BAUGHAN.

Witnesses:
H. BARNES,
E. PETERSON.